A. P. KIRCHHUBER.
TURNBUCKLE.
APPLICATION FILED APR. 10, 1918.

1,275,042.

Patented Aug. 6, 1918.

WITNESSES
Edw. Thorpe
Geo. J. Hosler

INVENTOR
Albert P. Kirchhuber
BY Mundle
ATTORNEYS

UNITED STATES PATENT OFFICE.

ALBERT P. KIRCHHUBER, OF BROOKLYN, NEW YORK.

TURNBUCKLE.

1,275,042.  Specification of Letters Patent.  Patented Aug. 6, 1918.

Application filed April 10, 1918. Serial No. 227,688.

*To all whom it may concern:*

Be it known that I, ALBERT P. KIRCHHUBER, a citizen of the United States, and a resident of the city of New York, borough of Brooklyn, in the county of Kings and State of New York, have invented a new and Improved Turnbuckle, of which the following is a full, clear, and exact description.

The object of the invention is to provide a new and improved turnbuckle for adjusting the tension of stays, braces, links or similar devices made of wire, cable and like material and used on aeroplanes and other structures. Another object is to provide a convenient and simple means for quickly and securely attaching the ends of the stay or brace to the turnbuckle.

With these and other objects in view the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in both views.

Figure 1:
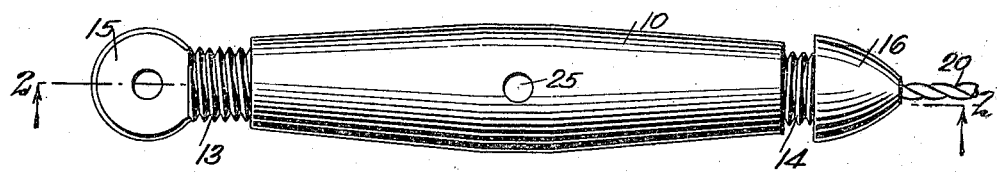
Figure 1 is a side elevation of the turnbuckle.
Figure 2:
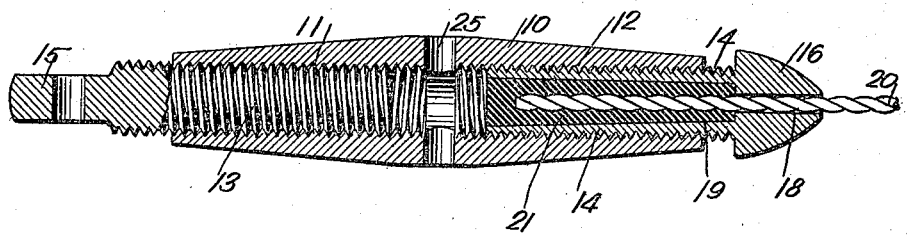
Fig. 2 is a longitudinal central section of the same on the line 2—2 of Fig. 1.

The tubular body 10 of the turnbuckle is provided at its ends with right and left hand screw threads 11 and 12 on which screw bolts 13 and 14, of which the bolt 13 terminates at its outer end in an eye 15 for attaching the turnbuckle to a suitable support. The other bolt 14 is provided at its outer end with a head 16 having a central bore 18 terminating at its inner end in a larger bore 19 formed in the bolt 14. The large bore 19 is preferably tapered from the inner end to the outer end, as plainly indicated in Fig. 2. The stay, brace, link or a similar connecting member 20 made of wire, cable or similar material, extends snugly through the bore 18 into the bore 19, and the portion of the connecting member 20 within the bore 19 is embedded in a filling material 21 to securely attach the device 20 to the bolt 14. In practice, the molten metal is poured into the bore 19 after the connecting member 20 is inserted therein to embed the said connecting member and to securely hold it in position in the bolt 14. By tapering the bore the filling material cannot be drawn out of the bore on placing the connecting member 20 under tension on turning the body 10 in the usual manner.

The body 10 is provided at its middle with a diametrical opening 25 for the insertion of a suitable tool to permit convenient turning of the body 10 when adjusting the turnbuckle with a view to give the desired tension to the connecting member 20.

From the foregoing it will be seen that by the arrangement described, the desired tension can be given to the stay or brace and the end of the latter can be quickly and securely fastened to the bolt 14 prior to the latter being screwed into the hollow body 10.

Having thus described my invention, I claim as new and desire to secure by Letters Patent:—

1. A turnbuckle, comprising a body and a bolt screwing in the said body and provided with two bores of different diameters, the smaller bore being located on the outer portion of the bolt and the larger bore being arranged on the inner portion of the bolt, the bores being adapted to receive the end of the member on which the turnbuckle is to be used, and a filling material in the inner large bore of the said body and embedding said portion of the said member within the large bore.

2. In a turnbuckle the combination of a connecting member, a turnbuckle body, a bolt screwing in the said body and provided with two bores of different diameters, the smaller bore being located on the outer portion of the bolt and the larger bore being arranged on the inner portion of the bolt, the large bore having a tapering wall and the small bore corresponding in diameter to that of the said connecting member on which the turnbuckle is to be used, the end of the said member extending through the said small bore into the large bore, and a filling in the large bore and embedding the end of the said connecting member.

ALBERT P. KIRCHHUBER.

Copies of this patent may be obtained for five cents each, by addressing the "Commissioner of Patents, Washington, D. C."